(12) United States Patent
Braithwaite

(10) Patent No.: US 12,244,698 B2
(45) Date of Patent: Mar. 4, 2025

(54) QUANTUM CHANNEL SYNCHRONIZATION

(71) Applicant: ID Quantique SA, Carouge (CH)

(72) Inventor: Martyn Braithwaite, Bristol (GB)

(73) Assignee: ID QUANTIQUE SA, Carouge (CH)

( * ) Notice: Subject to any disclaimer, the term of this patent is extended or adjusted under 35 U.S.C. 154(b) by 513 days.

(21) Appl. No.: 17/620,397

(22) PCT Filed: May 28, 2020

(86) PCT No.: PCT/EP2020/064887
§ 371 (c)(1),
(2) Date: Dec. 17, 2021

(87) PCT Pub. No.: WO2020/254087
PCT Pub. Date: Dec. 24, 2020

(65) Prior Publication Data
US 2022/0345301 A1  Oct. 27, 2022

(30) Foreign Application Priority Data

Jun. 18, 2019 (EP) .................................. 19181005

(51) Int. Cl.
*H04L 9/08* (2006.01)
*G06F 1/12* (2006.01)
(Continued)

(52) U.S. Cl.
CPC .............. *H04L 9/0852* (2013.01); *G06F 1/12* (2013.01); *G06N 10/60* (2022.01); *H04B 10/70* (2013.01); *H04L 9/0819* (2013.01); *H04L 9/085* (2013.01)

(58) Field of Classification Search
CPC ..... H04L 9/0852; H04L 9/0819; H04L 9/085; G06F 1/12; G06N 10/60; H04B 10/70
See application file for complete search history.

(56) References Cited

U.S. PATENT DOCUMENTS

| | | | |
|---|---|---|---|
| 5,307,401 | A | 4/1994 | Matsuda |
| 5,768,378 | A | 6/1998 | Townsend |

(Continued)

FOREIGN PATENT DOCUMENTS

| | | |
|---|---|---|
| EP | 3018840 A1 | 5/2016 |
| EP | 3503461 A1 | 6/2019 |

OTHER PUBLICATIONS

Cochran et al., "Qubit-based clock synchronization for QKD systems using a Bayesian approach", Published on: Jul. 6, 2021 (Year: 2021).*

(Continued)

*Primary Examiner* — Henry Tsang
*Assistant Examiner* — Suman Debnath
(74) *Attorney, Agent, or Firm* — Tucker Ellis LLP

(57) ABSTRACT

The present invention relates to a quantum key distribution method 2000 for distributing a secret key over a quantum communication channel between a transmitter and a receiver, the method comprising the steps of: synchronizing S2100 a clock between the transmitter and the receiver, distributing S2200 the secret key from the transmitter to the receiver, wherein the synchronizing step S2100 comprises: a first transmitting step S2120 for transmitting a N-th bit of the clock from the transmitter to the receiver, a second transmitting step S2130 for transmitting acknowledgement of reception of the N-th bit from the receiver to the transmitter, a first checking step S2140 for checking if the N-th bit is a most significant bit of the clock, and an incrementing step S2150 for incrementing the value of N if the first checking step S2140 indicates that the N-th bit is not the most significant bit of the clock.

10 Claims, 11 Drawing Sheets

(51) Int. Cl.
  *G06N 10/60* (2022.01)
  *H04B 10/70* (2013.01)

(56) References Cited

U.S. PATENT DOCUMENTS

| | | |
|---|---|---|
| 6,834,367 B2 | 12/2004 | Bonneau |
| 7,539,314 B2 | 5/2009 | Berzanskis |
| 7,869,599 B2 | 1/2011 | Tajima |
| 8,050,566 B2 | 11/2011 | Luo |
| 8,755,687 B2 | 6/2014 | Dynes et al. |
| 2006/0018475 A1 | 1/2006 | Vig |
| 2012/0294625 A1 | 11/2012 | Dynes |
| 2017/0230174 A1* | 8/2017 | Choi .................. H04L 9/12 |

OTHER PUBLICATIONS

Mahmood et al., "Impact of Hard-and Software Timestamping on Clock-Synchronization performance over IEEE 802.11", Published on: Jun. 19, 2014 (Year: 2014).*

Caillet et al., "Circuits for Transmitting and Receiving Characters Sent MSB or LSB First by Variable Number of Bits", Published on: Jul. 1, 1990 (Year: 1990).*

International Search Report and Written Opinion from corresponding International Application No. PCT/EP2020/064887, Jul. 17, 2020, 12 pages.

Chuang, Isaac, "Quantum algorithm for distributed clock synchronization", May 22, 2000, 4 pages.

De Burgh, Mark et al., "Quantum methods for clock synchronization: Beating the standard quantum limit without entanglement", Oct. 4, 2005, 9 pages.

\* cited by examiner

QUANTUM CHANNEL SYNCHRONIZATION

The present invention relates generally to the field of quantum cryptography, and more precisely to apparatus and methods enabling the synchronization of Quantum Key Distribution systems.

BACKGROUND OF THE INVENTION

Quantum cryptography, or quantum key distribution, is a method allowing the distribution of a secret key between two distant parties, the transmitter and the receiver, with a provable absolute security. Quantum key distribution relies on quantum physics principles and encoding information in quantum states, or qubits, as opposed to classical communication's use of bits. Usually, photons are used for these quantum states. Quantum key distribution exploits certain properties of these quantum states to ensure its security.

More particularly, the security of this method comes from the fact that the measurement of a quantum state of an unknown quantum system modifies the system itself. In other words, a spy eavesdropping on a quantum communication channel cannot get information on the key without introducing errors in the key exchanged between the transmitter and the receiver thereby informing the user of an eavesdropping attempt.

The encryption devices enable secure transmission of useful payload by performing some kind of symmetric encryption using the keys exchanged by quantum key distribution. Specific quantum key distribution systems are described for instance in U.S. Pat. No. 5,307,410, and in the article by C. H. Bennett entitled "Quantum cryptography using any two non-orthogonal states", Phys. Rev. Lett. 68, 3121 (1992).

A common implementation of a quantum key distribution system comprises a quantum communication channel, for instance an optical fiber where quantum encrypted photons are used as qubits, and a service channel, for instance a standard telecommunication channel. The bits composing the quantum key are transmitted by the qubits over the quantum communication channel.

FIG. 1A schematically illustrates a quantum key distribution system 1000 comprising a transmitter 1100 and a receiver 1200, transmitting over time "t" qubits QB0-QB4, of an exemplary quantum key, across a quantum communication channel 1300. The service channel is not illustrated. In an ideal operation, the qubits QB0-QB4 are received intact by the receiver 1200, thus completing the transmission of the quantum key. In principle it is thus possible to transmit a quantum key using only the quantum communication channel.

However, as schematically illustrated in FIG. 1A the quantum communication channel 1300 has a relatively high rate of information loss and a relatively low transmission speed, particularly when compared to a standard communication channel. This may result in some of the qubits QB0-QB4 to be lost, such as QB0, QB3 and QB4, in the example illustrated in FIG. 1A.

One partial solution to this problem is to transmit the qubits at regular interval. As the qubits travel at the speed of light, the transmission latency is negligible compared to the transmission interval, such that the receiver 1200 can detect a missing qubits due to the lack of reception during the intended timeframe. This, however, only allows the receiver to recognize that a qubit is missing but, crucially, not which qubit is missing.

This problem is illustrated further in FIG. 1B. As can be seen, the receiver can identify that two subsequent qubits have been received. However, without an initial reference, it cannot know whether those are QB0 and QB1, QB1 and QB2, QB2 and QB3, etc.

What is needed to solve this problem is a manner to synchronize the transmitter 1100 and the receiver 1200. With synchronization, if at a given time t the receiver 1200 receives a qubit, the receiver 1200 will be able to identify it as QB0, QB1, QB2, etc.

For practical implementations of quantum key distribution systems, the synchronization of a channel consists generally in sampling the detector of the receiver 1200 when the signal arrives. In other words, the synchronization of the channel implies knowing when the qubit number "n" is expected to arrive at the receiver 1200.

This timing is relevant because it defines when the receiver 1200 samples its detector to determine the value of this qubit number "n". If there is a problem with the synchronization, the receiver 1200 might consider the value of the mth qubit sent by the transmitter as the nth qubit. Hence, a proper synchronization of a communication channel is needed in order to perform proper communication.

In the case of the service channel, since this can be implemented as a conventional communication channel, conventional synchronization techniques may be employed, such as data and clock recovery technique. In known systems the synchronization is usually performed with clock and data recovery circuits (CDR), as in the case of USB, SATA, and ETHERNET connections. With CDR techniques, the clock signal, which provides the timing necessary to allow digital circuitry to operate on digital data, is transmitted along with the data. Therefore, it is typical for fiber optic communication links to require that clock signal, at the receiving end of the link, is extracted from the incoming data signal. In order to extract such clock signal at the receiving end, clock and data recovery circuits are employed.

Conventional clock and data recovery circuits implement for instance phase-lock loops (PLL), of which a full description is reported in U.S. Pat. No. 6,834,367. These kinds of technology are possible on the service channel because it is implemented with classical communication devices that have an error rate of almost zero (<10-12). This means that when a bit is emitted there is a very high probability that it will be detected by the receiver.

However, CDR techniques are inefficient for synchronization in communication with single photons such as in a quantum communication channel 1300.

This issue is described in several sources, as for example US patent application 2012/0294625. The synchronization of the quantum communication channel is much more complicated because the bit value carriers travelling in this channel are single quantum particles, for instance single photons. The single photon can be absorbed by the propagating medium during the transmission. This leads to a statistical behavior on the quantum receiver side. Three output values are possible, i.e. "1", "0", and "no detection". This makes the synchronization techniques used for classical communication channels unusable in the quantum communication channel 1300. This issue is also reported in U.S. Pat. No. 8,755,687.

To solve this problem, usually, apparatus for quantum key distribution are equipped with three channels, one of which is fully dedicated to the synchronization of the quantum communication channel 1300.

Different descriptions of approaches of quantum key distribution apparatuses implementing Three channels are proposed in U.S. Pat. Nos. 5,768,378/6,834,367/7,539,314/7,869,599/8,050,566/8,755,687 as well as published US patent applications 2006/0018475 and 2012/0294625 and non-patent literature: (i) A. Rubenok, J. A. Slater, P. Chan, I. Lucio-Martinez, and W. Tittel, Real-world two-photon interference and proof-of-principle quantum key distribution immune to detector attacks, arXiv:1304.2463v1 (2013); (ii) M. Sasaki, M. Fujiwara, H. Ishizuka, W. Klaus & al., Field test of quantum key distribution in the Tokyo QKD Network (2011); (iii) X. F. Mo, I. Lucio-Martinez, P. Chan, C. Healey, S. Hosier, W. Tittel, Time-cost analysis of a quantum key distribution system clocked at 100 MHz (2011); (iv) A. Tanaka, M. Fujiwara, S. W Nam, Y. Nambu, S. Takahashi, W Maeda, K. Yoshino, S. Miki & al., Ultra-fast quantum key distribution over a 97 km installed telecom fiber with wavelength division multiplexing clock synchronization (2008).

Recently, in EP patent application 3,018,840 A1, a quantum key distribution system and method have been proposed to perform the synchronization of the quantum communication channel 1300 without using an additional channel by linking the frequency of both the quantum and the classical channels. With this procedure, the quantum key distribution transmitter 1100 and receiver 1200 are firstly synchronized in frequency with the clock signal of the service channel, during the start-up phase. After the frequency is synchronized, while the system is running it performs a continuous tracking of the quantum communication channel synchronization, by means of an oversampling method. In fact, by oversampling the detections, an analysis of the probability of detection in temporal gates where no qubits are supposed to impinge the detector allows extrapolating a phase mismatch, and the phase can be corrected with a phase adaptation, so that the system is kept synchronized while running.

Additionally, in European patent application EP17209666 a solution for reducing the time necessary for the start-up phase was proposed based on the use of a variable optical attenuator on the quantum key distribution transmitter side.

Most of the previous synchronization methods are based on the approach of pattern recognition. The transmitter 1100 transmits a pattern, for instance a known array of qubits. When the receiver 1200 receives the expected pattern it can synchronize to the clock of the transmitter 1100, so that a subsequent communication can be performed. However, due to the quantum nature of the quantum communication channel 1300, some bits of the pattern will not be detected, thus the pattern has to be sent iteratively and a memory for the storage of frame data is necessary. This results in a longer synchronization time. For instance, with current technology, synchronization times in the order of 15 to 45 minutes are not uncommon. Moreover, the known pattern has to be stored at the receiver 1200, increasing the hardware requirements of the receiver 1200.

It is thus an object of some embodiments of the invention to provide a quantum key distribution synchronization apparatus or method, which enables a fast and/or simpler synchronization.

SUMMARY OF THE INVENTION

The invention is based on the general approach that synchronization of a clock can be obtained by transmitting the current bits of the clock, starting from the least significant bit and moving to a transmitting a higher significant bit when the receiver confirms reception of the present bit.

An embodiment of the invention can relate to a quantum key distribution method for distributing a secret key over a quantum communication channel between a transmitter and a receiver, the method comprising the steps of: synchronizing a clock between the transmitter and the receiver, distributing the secret key from the transmitter to the receiver, wherein the synchronizing step comprises: a first transmitting step for transmitting a N-th bit of the clock from the transmitter to the receiver, a second transmitting step for transmitting acknowledgement of reception of the N-th bit from the receiver to the transmitter, a first checking step for checking if the N-th bit is a most significant bit of the clock, and an incrementing step for incrementing the value of N if the first checking step indicates that the N-th bit is not the most significant bit of the clock.

Thanks to this approach, any carry-over which may occur during the synchronization at the receiver does not impact the correct operation of the synchronization method.

In some embodiments, the first transmitting step can be executed across the quantum communication channel, and the second transmitting step can be executed across a service channel different from the quantum communication channel.

Thanks to this approach is it possible to make efficient use of the service channel, thus increasing the speed of synchronization, without impacting the safety of the quantum key distribution method.

In some embodiments, the synchronizing step can further comprise a second checking step for checking if a value for the N-th bit has been detected at the receiver.

Thanks to this approach it is possible to advantageously confirm that the N-th bit has been received by the receiver before moving on to the subsequent bit thus ensuring that the bits are correctly synchronized. Thanks to this approach the synchronization step can thus be tolerant to the loss of information across the quantum communication channel resulting in a lack of detection at the receiver.

In some embodiments, the synchronizing step can further comprise a third checking step for checking if a consensus for the value for the N-th bit has been reached at the receiver.

Thanks to this approach the synchronization step can be tolerant to the erroneous transmission of information across the quantum communication channel resulting in a wrong detection at the receiver.

In some embodiments, the third checking step can further comprise a storing step for storing a plurality of values for the N-th bit, a fourth checking step for checking, for each of the plurality of values for the N-th bit stored in the storing step, if the stored value correspond to an expected value for the N-th bit, a confirming step for confirming, based on a result of the fourth checking step a value for the N-th bit.

Thanks to this approach, the synchronization step can be correctly operated even if the value of the N-bit being synchronized toggles one or more times during the synchronization.

In some embodiments, the confirming step can comprise a positive populating step for populating a quorum table with a positive value if the result of the fourth checking step is positive, a negative populating step for populating a quorum table with a negative value if the result of the fourth checking step is negative, a fifth checking step for checking if a predetermined quorum condition has been achieved, a deciding step for deciding a value of the N-th bit based on a result of the fifth checking step and for outputting a positive value for the third checking step.

Thanks to this approach, the synchronization step can be tolerant to the several erroneous transmission of information across the quantum communication channel resulting in a wrong detection at the receiver.

In some embodiments, the confirming step can further comprise a sixth checking step for checking if the quorum table has been populated to a predetermined level, a second incrementing step for incrementing a counter for the plurality of values for the N-th bit, Thanks to this approach it is possible to reduce the computational resources needed for the fifth checking step in those cases in which the quorum table is not sufficiently populated.

In some embodiments, the confirming step can further comprise a wiping step for wiping the quorum table.

Thanks to this approach it is possible to more quickly converge to a quorum in cases where several transmissions of the N-th bit have been affected by an erroneous transmission.

An embodiment of the invention can further relate to a receiver for a quantum key distribution system for distributing a secret key over a quantum communication channel between a transmitter and the receiver, the receiver comprising a controller configured to perform one or more of the second transmitting step, and/or the second checking step, and/or the third checking step.

Thanks to this approach the receiver can obtain the advantageous effect described with reference to those steps.

BRIEF DESCRIPTION OF THE DRAWINGS

The invention will be described with reference to the drawings, in which the same reference numerals indicate the same feature. In particular, FIGS. 1A and 1B schematically illustrate a quantum key distribution system 1000 comprising a transmitter 1100 and a receiver 1200 according to the prior art.

DETAILED DESCRIPTION

The invention will be described, for better understanding, with reference to specific embodiments. It will however be understood that the invention is not limited to the embodiments herein described but is rather defined by the claims and encompasses all embodiments which are within the scope of the claims.

Figure 1A:
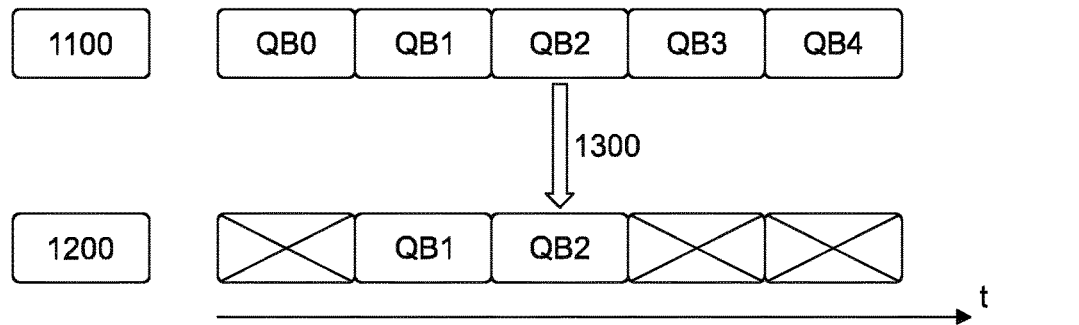
Figure 1B:
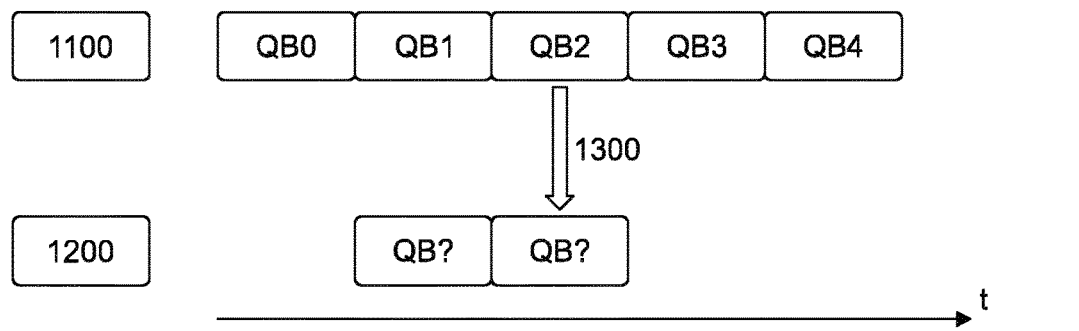
Figure 2:
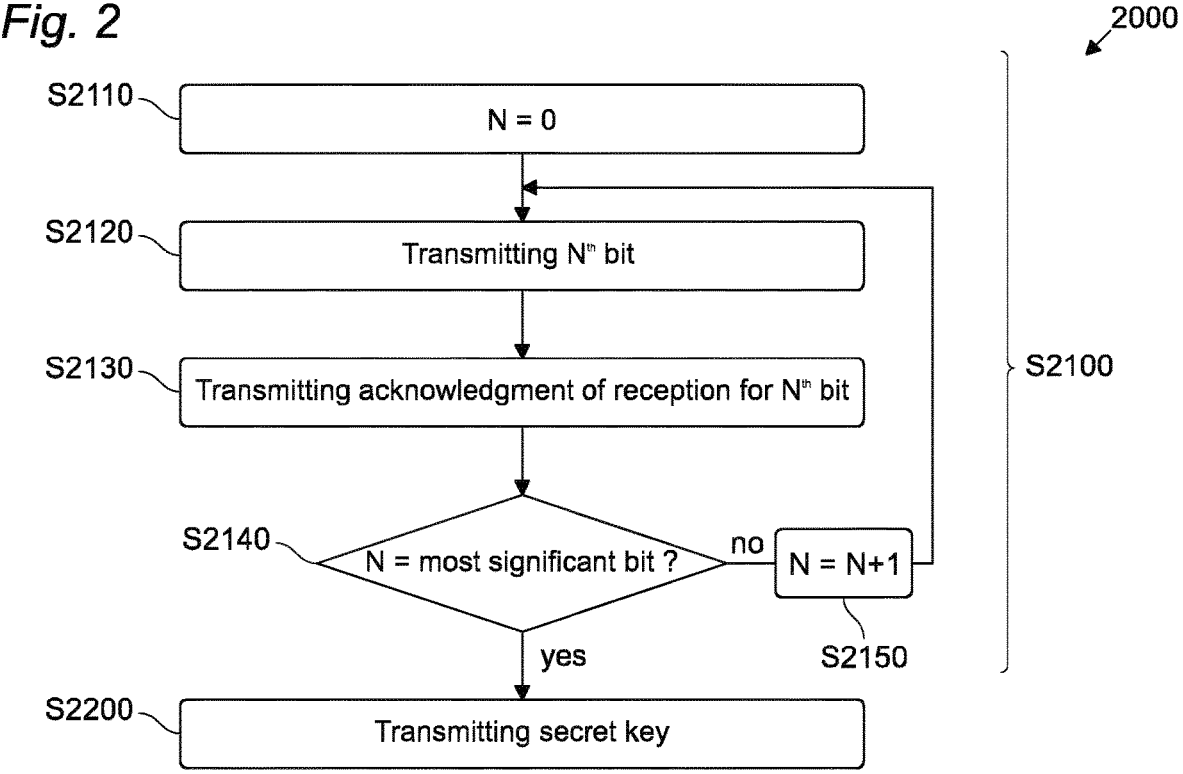
FIG. 2 schematically illustrates a quantum key distribution method 2000 according to an embodiment of the invention.
Figure 3:
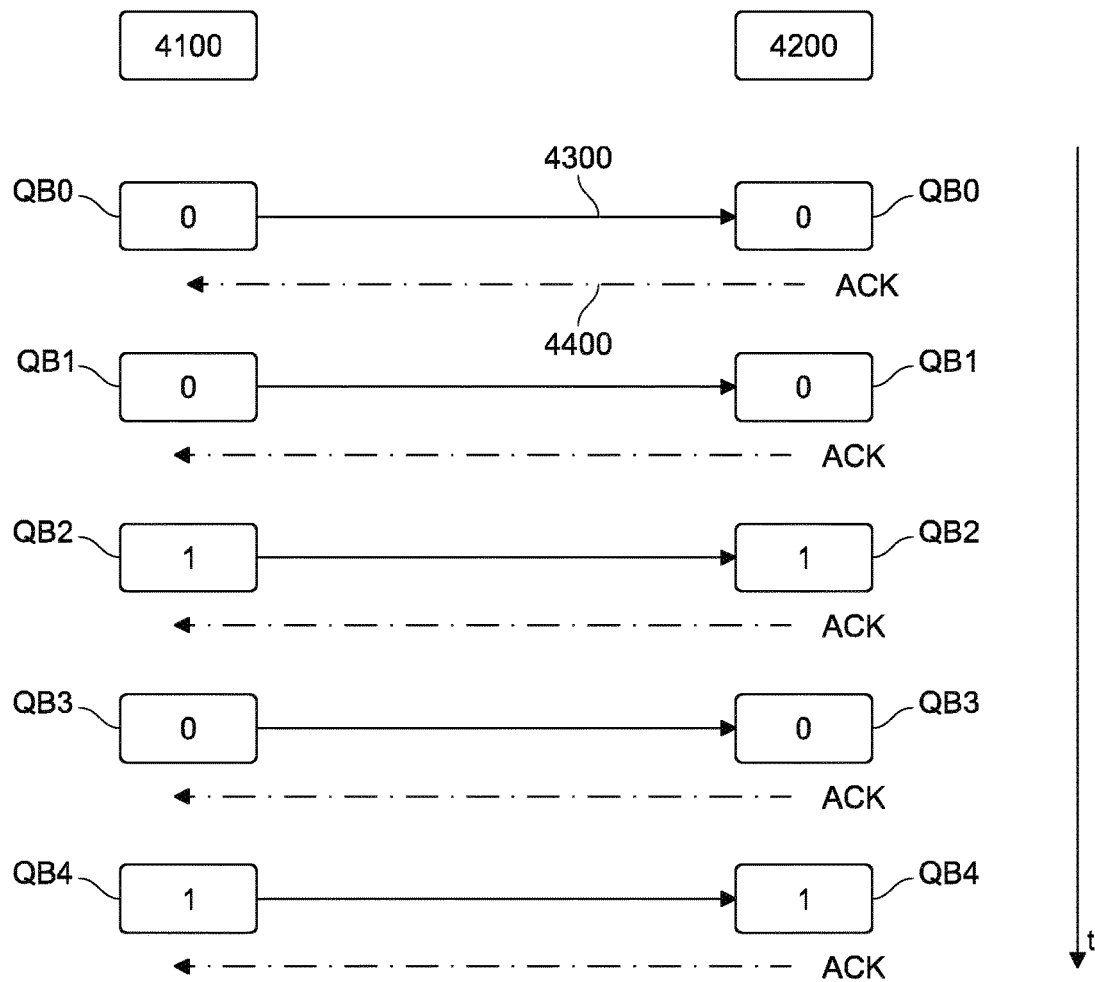
FIG. 3 schematically illustrates an exemplary synchronizing step in accordance with the quantum key distribution method 2000.

FIG. 2 schematically illustrates a quantum key distribution method 2000 according to an embodiment of the invention. The method 2000 will be better understood with reference to the quantum key distribution apparatus 4000, illustrated in FIG. 4, as well as reference to FIG. 3, which schematically illustrates an exemplary synchronizing step in accordance with the quantum key distribution method 2000. In FIG. 3, a clock having a bit value of 10100, from the most to the least significant bit, is illustrated, it will be clear that this is an exemplary value only.

Figure 4:
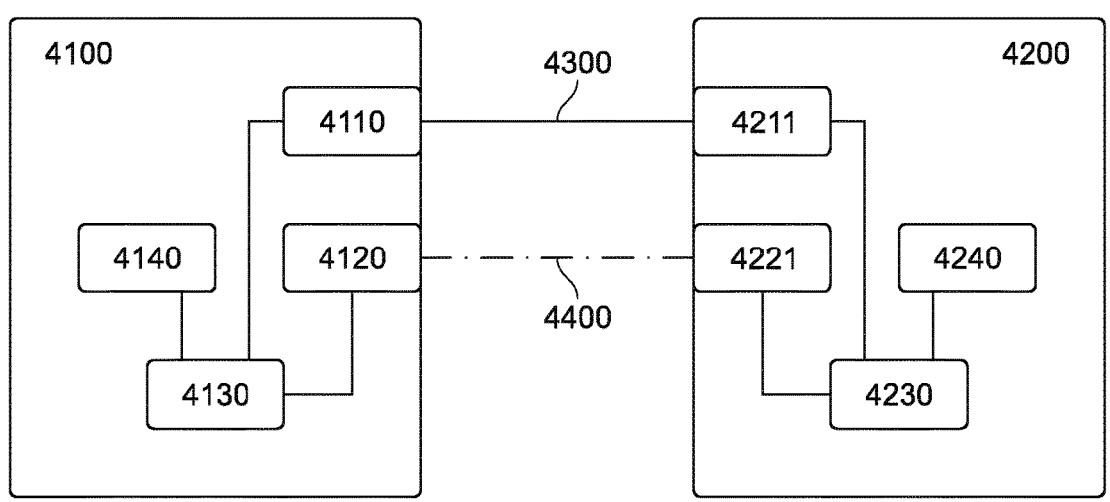
FIG. 4 schematically illustrates a quantum key distribution apparatus 4000 according to an embodiment of the invention.

As can be seen in FIGS. 2 and 4, the quantum key distribution method 2000 can be implemented for distributing a secret key over a quantum communication channel 4300 between a transmitter 4100 and a receiver 4200. In particular the quantum communication channel 4300 can be implemented by any physical channel allowing the transmission of qubits such as, for instance, an optical channel, or via quantum entanglement.

The quantum communication channel 4300 is known to be slow and error prone, particularly in comparison with other known wired communication channels, such as the Ethernet, and/or wireless telecommunications channels, such as satellite links, GSM, 4G, 5G, etc. To reduce the disadvantages of the quantum communication channel 4300 it is thus generally known to also implement a service channel 4400 between the transmitter 4100 and the receiver 4200. The service channel 4400 is used to transmit information which does not need the safety made possible by the quantum communication channel 4300. The service channel 4400 can be implemented by means of any appropriate known telecommunication technology which has better speed and/or reliability than the quantum communication channel 4300.

As visible in FIG. 4, the transmitter 4100 comprises a quantum communication channel transmitter 4110, configured to transmit qubits on the quantum communication channel 4300 and a service channel receiver 4120 configured to receive bits on the service channel 4400. Moreover the transmitter 4100 comprises a clock 4140, the purpose of which shall be more clear when describing the method 2000, and a controller 4130, configured so as to carry out some of the steps of method 2000. As it is visible, the controller 4130 is connected to the quantum communication channel transmitter 4110, the service channel receiver 4120, and the clock 4140.

As further visible in FIG. 4, the receiver 4200 comprises a quantum communication channel receiver 4211, configured to receive qubits on the quantum communication channel 4300 and a service channel transmitter 4221 configured to transmit bits on the service channel 4400. Moreover the receiver 4200 comprises a clock 4240 and a controller 4230, configured so as to carry out some of the steps of method 2000. As it is visible, the controller 4230 is connected to the quantum communication channel receiver 4211, the service channel transmitter 4221, and the clock 4240.

While reference is made to a clock 4140, 4240 the skilled person will understand that this does not force any specific constraints on the clock 4140, 4240 which may in principle be implemented by any counter with the appropriate bit size. That is, the clock 4140, 4240 is not limited, for instance, to a 24 hours window, to a frequency of 1 second, etc.

The method 2000 generally allows the clock 4240 of the receiver 4200 to be synchronized with the clock 4140 of the transmitter 4100 in a reliable and/or efficient manner, so as to allow a subsequent secret key transmission.

In particular, the method 2000 generally comprises a step S2100 of synchronizing a clock between the transmitter 4100 and the receiver 4200, and a step S2200 of distributing the secret key from the transmitter 4100 to the receiver 4200.

More specifically, the synchronizing step S2100 comprises a first transmitting step S2120 for transmitting a N-th bit of the clock from the transmitter 4100 to the receiver 4200. This is better understood with reference to FIG. 3, in which the transmission of bits QB0-QB4 is illustrated as an example of the transmission of a clock 4140 which can be encoded on five bits QB0-QB4. It will be clear that all bits transmitted on the quantum communication channel 4300 are, more precisely, qubits, at least during their transmission over the quantum communication channel 4300. However, since the method 2000 is described also in terms of the logic function of those qubits, QB0-QB4 will be simply referred to as bits in the description.

As it can be seen in FIG. 3, the first transmitting step S2120 allows the transmission of QB0 of the clock 4140 from the transmitter 4100 to the receiver 4200. The first transmitting step S2120 is implemented by the transmitter 4100. How the bit QB0 is transmitted is not specific to the invention and any known manner of transmitting over the quantum communication channel 4300 can be implemented. Once QB0 is received at the receiver 4200, the value of QB0 can be used to update the corresponding bit of the clock 4240 and/or stored in the controller 4230 for a subsequent calibration of the clock 4240. It will be clear that, in case the value of QB0 is stored in the controller instead of immediately updating the clock 4240, the lapse of time between the reception of QB0 and the subsequent updating of the clock 4240 will be considered so as to update the clock 4240 with the appropriate value, that is, the value of QB0 incremented by the time difference between its reception and the updated of the clock 4240. This is in particular possible if the frequency of the clock 4140, 4240 is standardized, that is, if the clock 4140, 4240 are intended to run at a predetermined frequency, which is thus known by the receiver 4200.

Once the bit QB0 is received at the receiver 4200, a second transmitting step S2130 allows the transmission of acknowledgement of reception ACK of the bit from the receiver 4200 to the transmitter 4100. The second transmitting step S2130 is implemented by the receiver 4200, for instance by an appropriate configuration of the controller 4230. The transmission of the ACK can be implemented over the quantum communication channel 4300. In some embodiments, however, it is preferred to implement it over the service channel 4400, as illustrated in FIG. 3. This provides the advantage that the method 2000 can provide a faster synchronization. Moreover, even though the service channel 4400 does not provide the same level of safety of the quantum communication channel 4300, this is not critical since the acknowledgement of reception ACK does not need to indicate the value of QB0, but only that a bit has been received over the quantum communication channel 4300.

In a subsequent first checking step S2140, it is checked whether the N-th bit is a most significant bit of the clock 4140. In the example of FIG. 3, the clock 4140 has 5 bits QB0, QB1, which thus results in a negative output of the first checking step S2140 after the transmission of QB0.

Subsequently, in a first incrementing step S2150, the value of N is incremented if the first checking step S2140 indicates that the N-th bit is not the most significant bit of the clock.

In this manner, as visible in FIG. 3, the method 2000 allows the transmission of bit QB0-QB1 of the clock 4140 of the transmitter 4100 to the receiver 4200. This enables the receiver 4200 to synchronize the clock 4240 with the clock 4140.

The transmission of the bits QB0-QB4 can, in some embodiments, be implemented from the least significant bit, here QB0, to the most significant bit QB4. This provides the particular advantage that a carry overflow of clock 4140 does not impact the synchronizing step S2100. This will be briefly explained in the following.

As an example it can be assumed, for instance that at the time of transmission of QB0, the value of the clock 4140 is 10100, as illustrated in the example of FIG. 3. If the QB0 is transmitted as the first bit, the clock 4240 can assume a value XXXX0, upon reception of the QB0, and can then keep on counting with a predetermined frequency, the same of clock 4140. That is, the value of QB0 at the clock 4240 can then evolve with the predetermined frequency, and there is no need for further transmission of QB0. The switching of the bit QB0 at the clock 4240 may or may not impact the value of QB1 at the clock 4240. That is, the controller 4230 may update the value of QB1 as QB0 increases and causes a carry overflow, or it may not. In both cases, the value of QB1 can be subsequently corrected by the reception of QB1 from the transmitter 4100. In particular, this is due to the low latency of the transmission of the bits QB0-QB4 over the quantum communication channel 4300, since the qubits propagate at the speed of light, making it possible for the receiver 4200 to receive the current value of QB1 which is actually valid at the transmitter 4100. This allows the receiver 4200 to confidently overwrite the value of QB1 at clock 4200, discarding any potential previous value thereof resulting from the bit carry overflow from QB0. When this process is repeated iteratively, as done by method 2000, synchronization of clocks 4140 and 4240 can be ensured in a reliable and efficient manner.

Yet in other terms, the method 2000 allows the clock 4240 to be aligned with the clock 4140 even if the alignment procedure lasts enough time for the clock 4140 to switch one or multiple times. This has the advantageous effect that the frequency of the clock 4140, 4240 is not limited by the speed of the synchronization step S2100.

Advantageously, it is noted that the first transmitting step S2120 does not need to be carried out at a specific frequency and/or with a predetermined regularity. That is, as it will be clear to those skilled in the art, the first transmitting step S2120 can transmit the values of the qubits in a regular and/or irregular manner. Moreover, the rate of transfer of the qubits QB0-QB4 can be implemented at any given speed, in particular at frequencies which are faster or slower than the frequency of the clock 4200. Furthermore, there needs to be no specific relationship between the frequency of the first transmitting step S2120 and the frequency of the clock 4200.

Furthermore, it will be clear that while the first transmitting step S2120 is represented as a single step in the figures, in practical implementations the transmitter 4100 may keep repeating the first transmitting step S2120 while the rest of the method 5000 is carried out.

That is, while the receiver 4200 carries out the steps following the first transmitting step S2120, the transmitter 4100 may keep repeating the first transmitting step S2120 for the current Nth value. This has the advantage that different kinds of transmitter 4100 may be implemented, without changing the receiver 4200 and/or the method 5000. Moreover, this allows the receiver 4200 to carry out a new reception as soon as ready, which may for instance depend on setting some receiving circuitry and/or detectors, without having to explicitly instruct the transmitter 4100 and/or before the instruction to repeat the transmission reaches the transmitter 4100.

It will thus be understood that, in some embodiments, the first transmitting step S2120 may comprise sending the Nth bit a plurality of times. In some of those embodiments, the first transmitting step S2120 may be repeated by the transmitter until either an indication to increase N is received, in form of an ACK signal, or it is deemed that all bits have been transmitted.

As discussed above, in some embodiments, the first transmitting step S2120 can be executed across the quantum communication channel 4300 while the second transmitting step S2130 can be executed across a service channel 4400, different from the quantum communication channel 4300. That is, while the quantum communication channel 4300 can be, for instance, an optical fiber and/or a wireless transmission medium allowing the transmission of information maintaining its quantum characteristics, the service channel 4400 can be, for instance, a more traditional wired communication channel, such as the Ethernet, the Internet, or a more traditional wireless communication channel, such as a radio and/or satellite link, GSM, 4G, 5G, etc., or a combination of such traditional wired communication channels and wireless communication channel.

This has the advantage of reducing the need to transfer information over the quantum communication channel 4300, thus also lowering the required throughput specifications of the quantum communication channel 4300. Moreover, since the service channel 4400 has generally a lower error in transmitting bits, thus requiring less retransmissions, the transmission of the ACK over the service channel 4400 may in fact be faster than transmitting it over the quantum communication channel 4300, even if the service channel has a latency higher than the quantum communication channel 4300.

Figure 5:
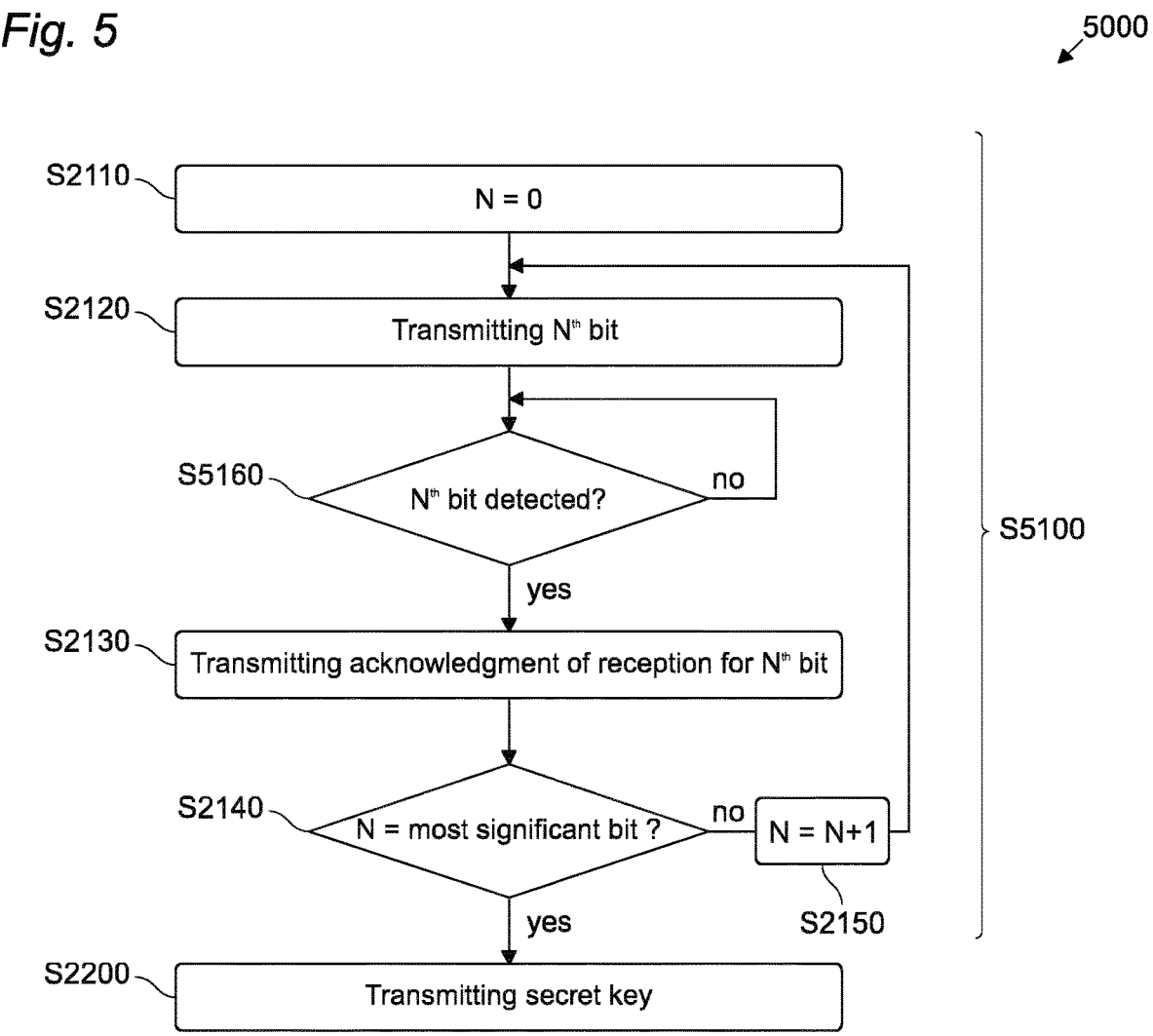
FIG. 5 schematically illustrates a quantum key distribution method 5000 according to an embodiment of the invention.

FIG. 5 schematically illustrates a quantum key distribution method 5000 according to a further embodiment of the invention. The method 5000 will be better understood with reference to the quantum key distribution apparatus 4000, illustrated in FIG. 4, as well as reference to FIG. 6, which schematically illustrates an exemplary synchronizing step in accordance with the quantum key distribution method 5000.

In particular, the quantum key distribution method 5000 differs from quantum key distribution method 2000 in that the synchronizing step S5100 further comprises, in comparison with the synchronizing step S2100, a second checking step S5160 for checking if a value for the N-th bit has been detected at the receiver 4200. The second checking step S5160 is implemented by the receiver 4200, for instance by an appropriate configuration of the controller 4230.

This allows compensating for the loss of qubits QB0-QB4 due for instance to a lossy medium implementing the quantum communication channel 4300.

Figure 6:
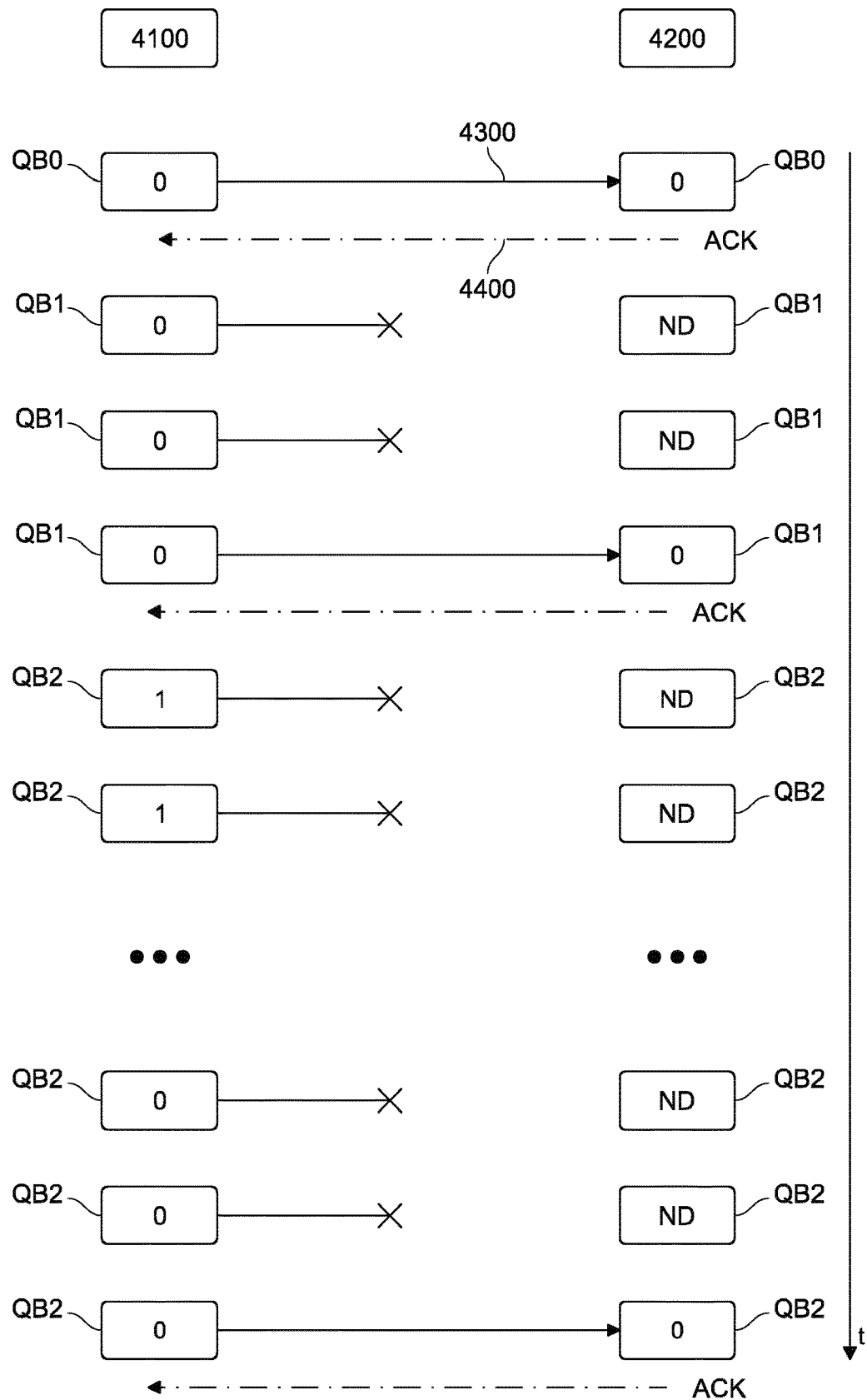
FIG. 6 schematically illustrates an exemplary synchronizing step in accordance with the quantum key distribution method 6000.

More specifically, as visible in the example of FIG. 6, QB0 is transmitted and received by the receiver 4200, which then transmits the corresponding ACK signal. Upon receiving the ACK signal the transmitter 4100 does not modify the index of the transmitted bit. That is, the first transmitting step S2120 may, in particular in the embodiment of method 5000, keep on transmitting the current value of the qubit N, until an ACK signal is received from receiver 4200. This is visible, for instance, in the case of QB1. In particular, QB1 is transmitted a first time with the first transmitting step S2120, without however being detected at the receiver 4200, as schematically indicated by ND, for No Detection. The reason why the receiver 4200 issues a ND signal may be various, for instance due to a lossy communication medium implementing the quantum communication channel 4300 and/or issues at the quantum communication channel receiver 4211. In any case, since the receiver doesn't detect a valid reception of QB1, the checking step S5160 is not answered positively. Meanwhile, the transmitter 4100 repeating the transmission S2110 of QB1, as illustrated, allows the receiver to carry out again the checking step S5160 until the receiver 4200 receives QB1 and issues a corresponding ACK signal.

The method 5000 is particularly advantageous as it also allows the correct synchronization of the clocks 4140, 4240 in the event of clock 4140 changing value due to the clock counter being incremented. This is the case, for instance, of QB2, as visible in FIG. 6. In particular, in the example of FIG. 6, the value of QB2 switches at clock 4140 from 0 to 1 during the synchronizing step S5100, due to a repeated number of attempts in transmitting QB2 to the receiver 4200. This change does not impact the correct operation of the synchronizing step S5100. In fact, once the value of QB2 is received at the receiver, the corresponding value of QB2 at the clock 4240 is overwritten with the received value, such that a correct alignment of clocks 4140, 4240 is ensured. It is further noted that the overwriting of QB2 does not impact the already synchronized values of QB0 and QB1 at clock 4240.

That is, the method 5000 allows implementing method 2000 in a quantum key distribution apparatus 4000 in which the quantum communication channel 4300 and/or the operation of the transmitter 4100 and/or receiver 4200 may cause one or more qubits QB0-QB4 not to be correctly transmitted from transmitter 4100 to receiver 4200.

Figure 7:
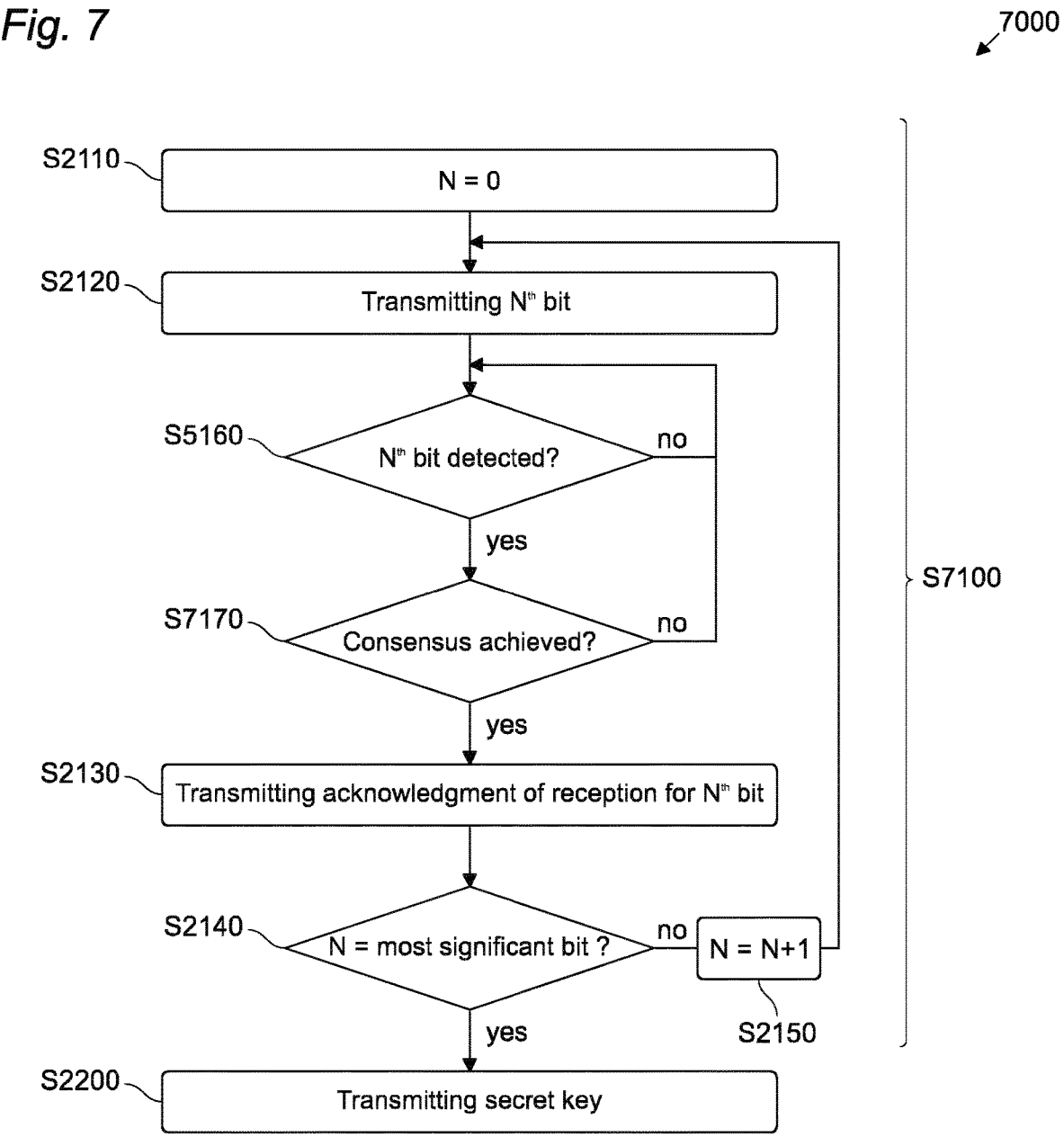
FIG. 7 schematically illustrates a quantum key distribution method 7000 according to an embodiment of the invention.

FIG. 7 schematically illustrates a quantum key distribution method 7000 according to a further embodiment of the invention. The method 7000 will be better understood with reference to the quantum key distribution apparatus 4000, illustrated in FIG. 4, as well as reference to FIG. 8, which schematically illustrates an exemplary synchronizing step in accordance with the quantum key distribution method 8000.

In particular, the quantum key distribution method 7000 differs from quantum key distribution method 5000 in that synchronizing step S7100 further comprises, in comparison with the synchronizing step S5100, a third checking step S7170, for checking if a consensus for the value for the N-th bit has been reached at the receiver 4200. The third checking step S7170 is implemented by the receiver 4200, for instance by an appropriate configuration of the controller 4230.

This allows compensating for the erroneous transmission of qubits QB0-QB4 due for instance to a medium implementing the quantum communication channel 4300, and/or due to the operation of the quantum communication channel transmitter 4110 and/or quantum communication channel receiver 4221 causing an error in the value of the transmitted qubit QB0-QB4.

Figure 8:
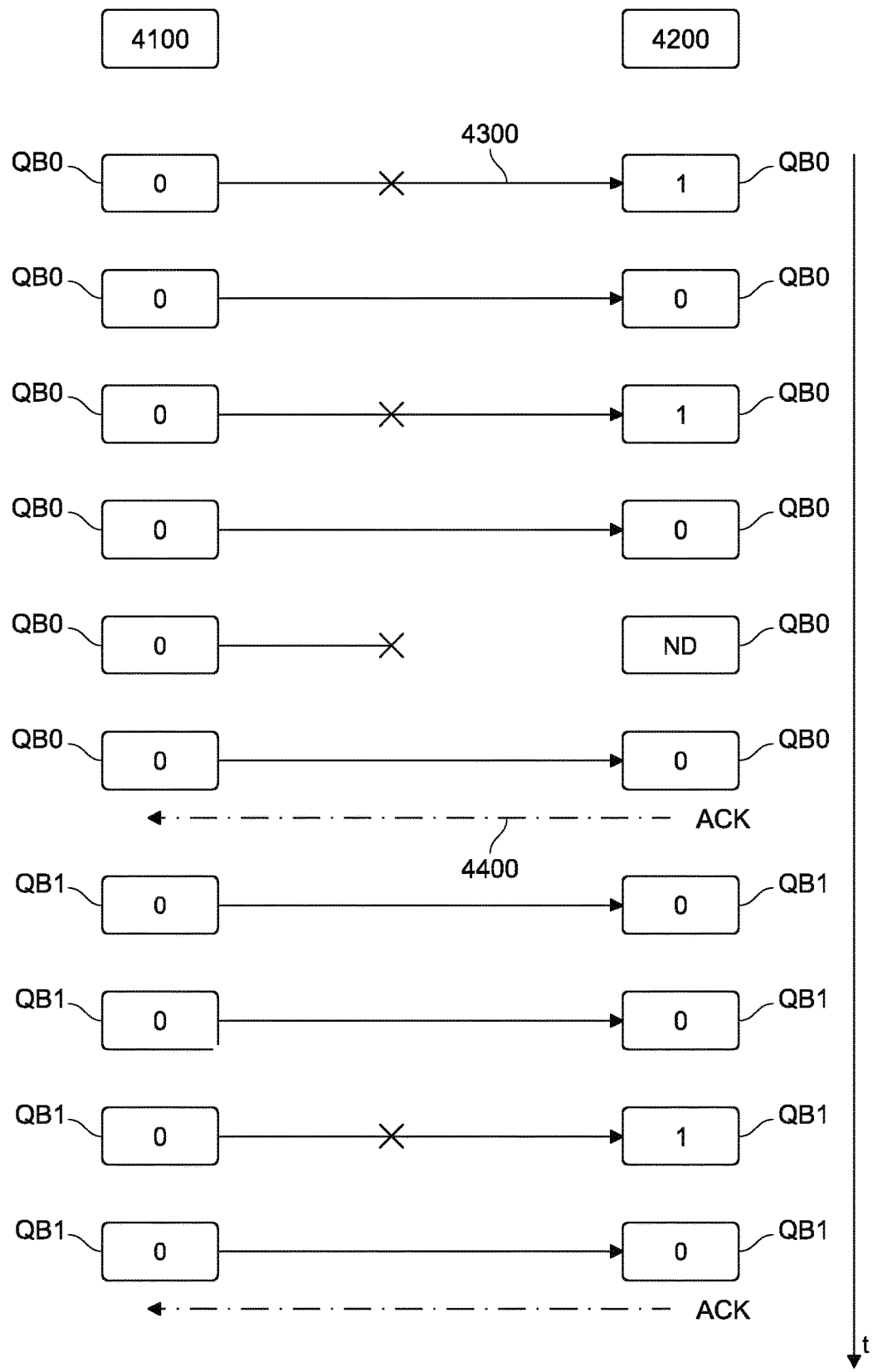
FIG. 8 schematically illustrates an exemplary synchronizing step in accordance with the quantum key distribution method 7000.

This can be better understood with the example illustrated in FIG. 8. As visible in FIG. 8, QB0 is transmitted as a value of 0 and, at a first attempt, received with an erroneous value of 1. In the method 5000, the value of 1 would be considered as correct and an ACK signal would then be issued. In the method 7000, however, this first reception of QB0 does not satisfy the third checking step S7170. This advantageously allows avoiding the propagation of the erroneous value for QB0.

While details on the third checking step S7170 will be described later in the description, the operation of the third checking step S7170 can be understood as requiring the reception of at least two values for the same qubit and providing an output based on a logic operation among the at least two values received. In the example of FIG. 8, the third checking step S7170 can be implemented by check which outputs a positive signal only if a give qubit has is received with the same value for at least a predetermined number of times, which has been set to 3 in the example of FIG. 8.

At a subsequent second attempt of transmitting QB0, the correct value of 0 is received at the receiver 4200. At a subsequent third attempt of transmitting QB0, the incorrect value of 1 is received at the receiver 4200 and at a subsequent fourth attempt of transmitting QB0, the correct value of 0 is received again at the receiver 4200. At this point, the receiver 4200 has received both values 0 and 1 two times each. In the example outlined above, in which the third checking step S7170 requires a value to repeat at least three times before providing a positive output, this causes the checking step S7170 to maintain its negative output and thus the detection of QB0 is repeated by the receiver 4200. As previously indicated, the transmitter 4100 may repeat transmitting QB0, in particular until the reception of an ACK signal.

At a subsequent fifth attempt of transmitting QB0, No Detection is issued by the receiver 4200. As already described with reference to the method 5000, this results in the transmission of QB0 being repeated by the transmitter 4100.

At a subsequent sixth attempt of transmitting QB0, the correct value of 0 is received at the receiver 4200. At this time, the condition of the exemplary third checking step S7170 is satisfied, so that the third checking step S7170 issues a positive output allowing the transmission of the ACK signal and the move to the transmission of QB1. As indicated above, it is understood that the exemplary third checking step S7170 outlined above is not limiting and the invention could be implemented in other manners, which will be described in the following.

The transmission of QB1 operates in a similar manner. Shortly, as visible in FIG. 8, the values of 0, 0 and 1 are received for QB1 so that the subsequent reception of 0 again satisfies the conditions of the exemplary third checking step S7170 outlined above thus resulting in the transmission of the ACK signal.

As it can be understood from the above, the provision of the third checking step S7170 allows the method 7000 to correctly synchronize the clocks 4140, 4240 also in the presence of errors in the transmission of QB0-QB4 which do not only cause an No Detection (ND), such as in the case of method 5000, but result in a detection, albeit of a wrong value.

In addition, or alternatively, to the exemplary implementation described above, the third checking step S7170 can be implemented as described in the following with reference to a possible implementation of third checking step S7170 by means of checking step S9170 and/or checking step S10170.

Figure 9:
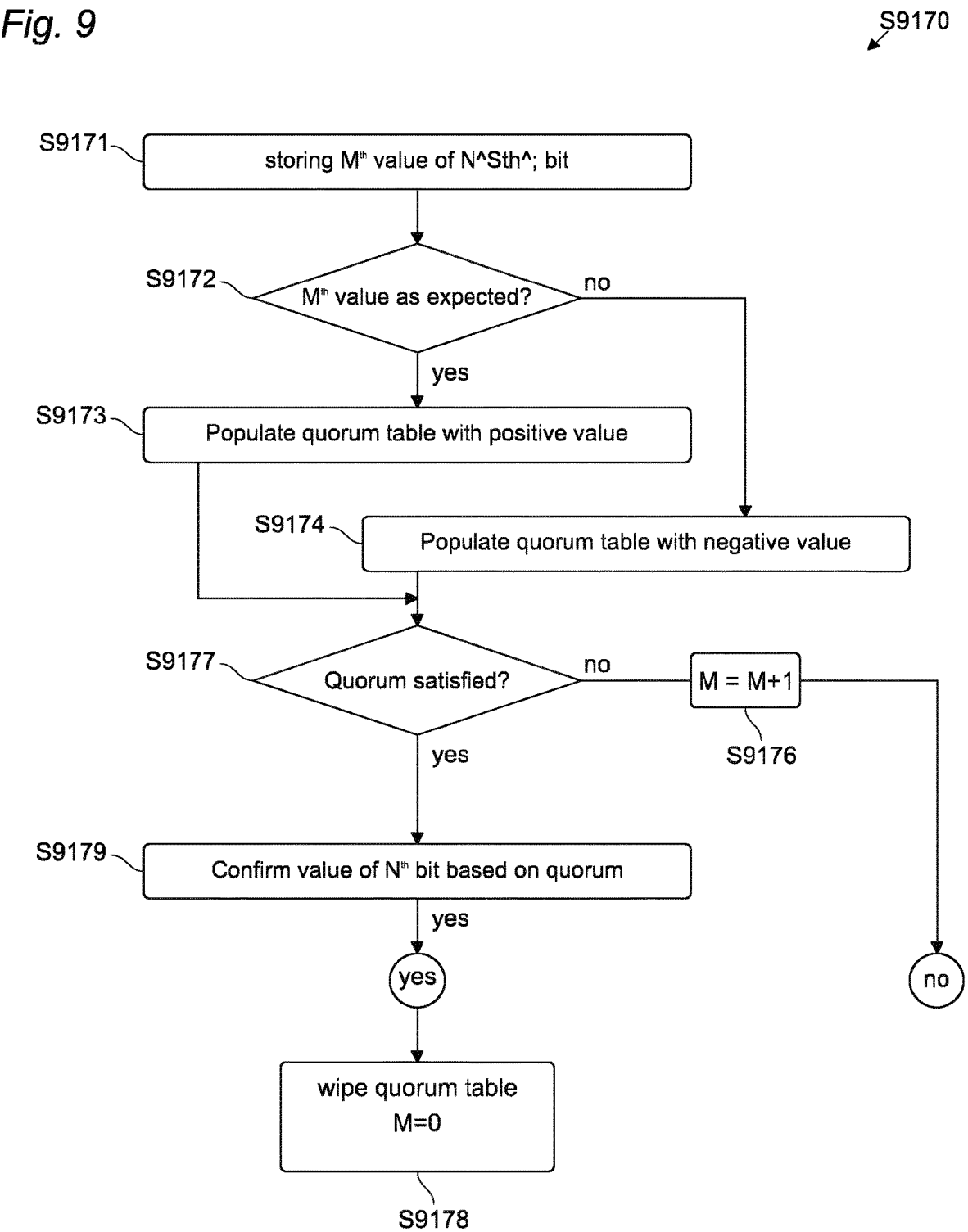
FIG. 9 schematically illustrates a possible implementation of a checking step S9170 according to an embodiment of the invention.

In particular, FIG. 9 schematically illustrates a possible implementation of checking step S9170 according to an embodiment of the invention. The "yes" and "no" circled outputs correspond to the "yes" and "no" output of the checking step S7170 as indicated in FIG. 7.

As can be seen in FIG. 9, the third checking step S9170 can comprise a storing step S9171 for storing a plurality of values for the N-th bit. In particular, as will be clear from the following description, the storing step S9171 is repeated a plurality of times and, at each time, a new M-th value for the same N-th bit is stored. It is understood that M is a counter which can be set to 0, for instance, at the setting step S2110 and at the step S2130 or S9178. More generally, it will be clear that the purpose of counter M is to increment an index of a stored value for the same N-th bit, so that M is generally set back to 0 when the N-th bit being transmitted changes.

The third checking step S9170 can further comprise a fourth checking step S9172 for checking, for each of the plurality of values for the N-th bit stored in the storing step S9171, if the stored value correspond to an expected value for the N-th bit. That is, for any M-th value of the N-th bit, it is checked if the M-th value correspond to the expected value of the N-th bit at the time at which the M-th value of the N-th bit was received.

For instance, assuming the M-th value for the N-th bit is received at a given time T0, the receiver 4200 will have an expected value for the N-th bit, at the given time T0, corresponding to the value of the N-th bit of the clock 4240 at the given time T0. In some embodiments, in order to ensure that the clock 4240 has a value for the N-th bit, it may be sufficient to let the clock 4240 run from any given value.

The fourth checking step S9172 can be implemented in a plurality of manners, as long as they allow the fourth checking step S9172 to output one value if the M-th value for the N-th bit correspond to the respectively expected value and to output another value if the M-th value for the N-th bit does not correspond to the respectively expected value. One possible implementation for the fourth checking step S9172 could be, for instance, an XOR operation among the M-th value for the N-th bit and the respectively expected value from the clock 4240. Another possible implementation for the fourth checking step S9172 could be, for instance, a binary sum or a binary difference operation among the M-th value for the N-th bit and the respectively expected value from the clock 4240.

The third checking step S9170 can further comprise a confirming step S9173-S9179 for confirming, based on a result of the fourth checking step S9172 a value for the N-th bit. That is, the third checking step S9170 is generally based on the principle that the decision whether a consensus has been achieved on the value of the N-th bit is generally based on the result of the fourth checking step S9172. This provides an advantage, as will be more clear with reference to the example illustrated in FIG. 13, in that the third checking step S9170 is capable of reaching a consensus for the value of the N-th bit even if the value of the N-th bit sent by the transmitter 4100 toggles, potentially also several times, during the execution of the synchronizing step S7100.

Figure 13:
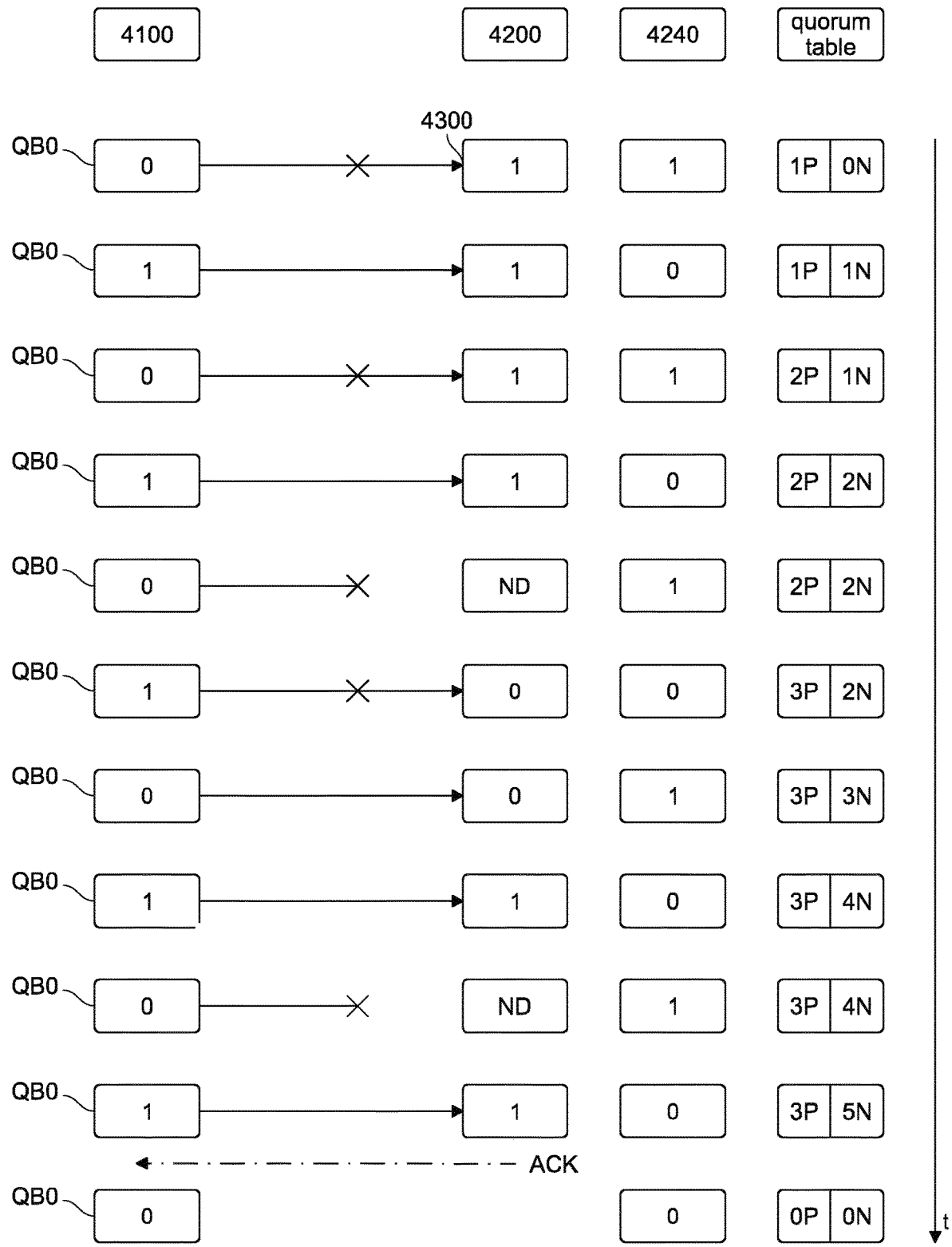
FIG. 13 schematically illustrates an exemplary synchronizing step implementing the checking step S9170.

In order to achieve this advantage it is advantageous to provide to base the confirming step S9173-S9179 on the output of the fourth checking step S9172, for reasons which will be exemplified with reference to FIG. 13. How exactly the confirming step S9173-S9179 is implemented, as it will be clear to those skilled in the art of digital programming, can take several forms and the invention should thus not be limited to a specific implementation.

In the following, and in the figures, for sufficiency of disclosure and for clarity of explanation, one of those forms has been more specifically illustrated, and will be described in the following. It will however be clear that, in general, if the confirming step S9173-S9179 is based on the output of the fourth checking step S9172, it is possible to advantageously achieve the synchronization even in the presence of a toggling value for the N-th bit.

As can be further seen in FIG. 9, in some embodiments, the confirming step S9173-S9179 can comprise a positive populating step S9173 for populating a quorum table with a positive value, if the result of the fourth checking step S9172 is positive, and a negative populating step S9174 for populating a quorum table with a negative value, if the result of the fourth checking step S9172 is negative. Here, it will be understood that the positive value and the negative value are simply a formal way of distinguishing the two values, such that the positive value could be 1 and the negative 0, or vice versa. The quorum table can be implemented by any digital data representation which can store and/or count the number of occurrences of the positive values and of the negative values. While it is helpful to think of it as a table, as will be done with reference to the example illustrated in FIG. 13, this does not limit the implementation thereof to a data structure implementing a table. For instance, the quorum table could be implemented by one or more arrays, or it could be as simple as a counter for the positive values and for the negative values.

Generally, the purpose of the positive populating step S9173 and of the negative populating step S9174 is to iteratively record whether the M-th value received for the N-th bit was deemed to be corresponding or not to the expected value. It will be clear that, if there are several occurrences, for several M-th values for the N-th bit, to be deemed to correspond to the expected value, this generally indicates that the expected value, namely the value of the N-th bit of the clock 4240, is likely to be correct. Conversely, if there are several occurrences, for several M-th values for the N-th bit, where the M-th value if deemed not to correspond to the expected value, then the value of the N-th bit of the clock 4240 is likely to be incorrect. The purpose of the positive populating step S9173 and of the negative populating step S9174 is thus to collect enough positive and/or negative values to understand whether the value of the N-th bit of the clock 4240 is more likely to be correct or incorrect.

Moreover, the confirming step S9173-S9179 can further comprise a fifth checking step S9177 for checking if a predetermined quorum condition has been achieved. The quorum condition is generally computed on the positive and negative values stored in the quorum table. The quorum condition could be any operation which, based on the positive and negative values stored in the quorum table, allows to determine if the value of the N-th bit of the clock 4240 is more likely to be correct or incorrect.

As an example, the quorum condition could be any of the following:
  is the number of positive values in the quorum table equal to a predetermined value?
  is the number of negative values in the quorum table equal to a predetermined value?
  is the number of positive values in the quorum table higher than the number of negative values in the quorum table by a predetermined value?
  is the number of negative values in the quorum table higher than the number of positive values in the quorum table by a predetermined value?
  is there a majority of values, positive or negative, in the quorum table?
  is there a majority of values, positive or negative, in the quorum table by at least a predetermined value?
  etc.

As an example, if the quorum table has 0 as positive value and 1 as negative value, and the quorum table comprises the values [0, 0, 0, 0, 0, 1] while the quorum condition is a majority decision, the fifth checking step S9177 can confirm that the quorum condition is satisfied, since there is a majority of positive values 0.

If the output of the fifth checking step S9177 is negative, the value of M is incremented at a second incrementing step S9176 and the third checking step S9170 outputs a negative "no" value. This will result in a retransmission of the N-th bit, and the third checking step S9170 being executed again.

Moreover, the confirming step S9173-S9179 can further comprise a deciding step S9179 for deciding a value of the N-th bit based on a result of the fifth checking step S9177 and for outputting a positive value for the third checking step S7170, S9170.

In general, it will be clear that the manner in which the deciding step S9179 decides the value of the N-th bit depends on the manner in which the quorum condition is expressed. For instance, if the quorum condition is expressed as
  is the number of positive values in the quorum table higher than the number of negative values in the quorum table by a predetermined value?
than the fifth checking step S9177 will only provide a positive output when there is such a higher number of positive values than of negative values. This higher number of positive values indicates that it is likely that the value of the N-th bit of the clock 4240 is correct, since various comparisons with the M-th values received from the transmitter 4100 have resulted in a positive outcome. In this case, the deciding step S9179 will decide to maintain the value for the N-th bit which is already present in clock 4240.

Conversely, if the quorum condition is expressed as
  is the number of negative values in the quorum table higher than the number of positive values in the quorum table by a predetermined value?
than the fifth checking step S9177 will only provide a positive output when there is such a higher number of negative values. This indicates that it is likely that the value of the N-th bit of the clock 4240 is incorrect. In this case, the deciding step S9179 will thus decide to toggle the value for the N-th bit which is present in clock 4240.

In other words, if the fifth checking step S9177 is expressed so as to provide a positive output when there is an indication that the value of the N-th bit of the clock 4240 is likely to be correct, the deciding step S9179 will maintain the value of the N-th bit of the clock 4240. If, on the other hand, the fifth checking step S9177 is expressed so as to provide a positive output when there is an indication that the value of the N-th bit of the clock 4240 is likely to be incorrect, the deciding step S9179 will toggle the value of the N-th bit of the clock 4240.

It will further be clear that, in some embodiments, the fifth checking step S9177 may be implemented so to provide as output not only that the quorum has been satisfied but also the value, positive or negative of the quorum. In these embodiments, the deciding step S9179 can then be implemented so as to maintain the value of the N-th bit of the clock 4240, in the presence of a positive quorum, and to toggle the value of the N-th bit of the clock 4240, in the presence of a negative quorum.

The execution of the deciding step S9179 thus sets the value of the N-th bit of the clock 4240. This also outputs a "yes" output for third checking step S9170, so that the quantum key distribution method 7000 can proceed to step S2130.

In a subsequent wiping step S9178, the quorum table is wiped and the value of M is set back to 0.

It has been found by the inventors that, in some embodiments, a size of the quorum table comprised between 100 and 300 values, is particularly well suited to balance a reliable and fast operation. It has also been found that, in some embodiments, particularly if the quorum condition is expressed as are positive or negative values at least [predetermined value]% of the size of the quorum table? the predetermined value can be comprised between 51% and 70%, as those values are particularly well suited to balance a reliable and fast operation.

Figure 10:
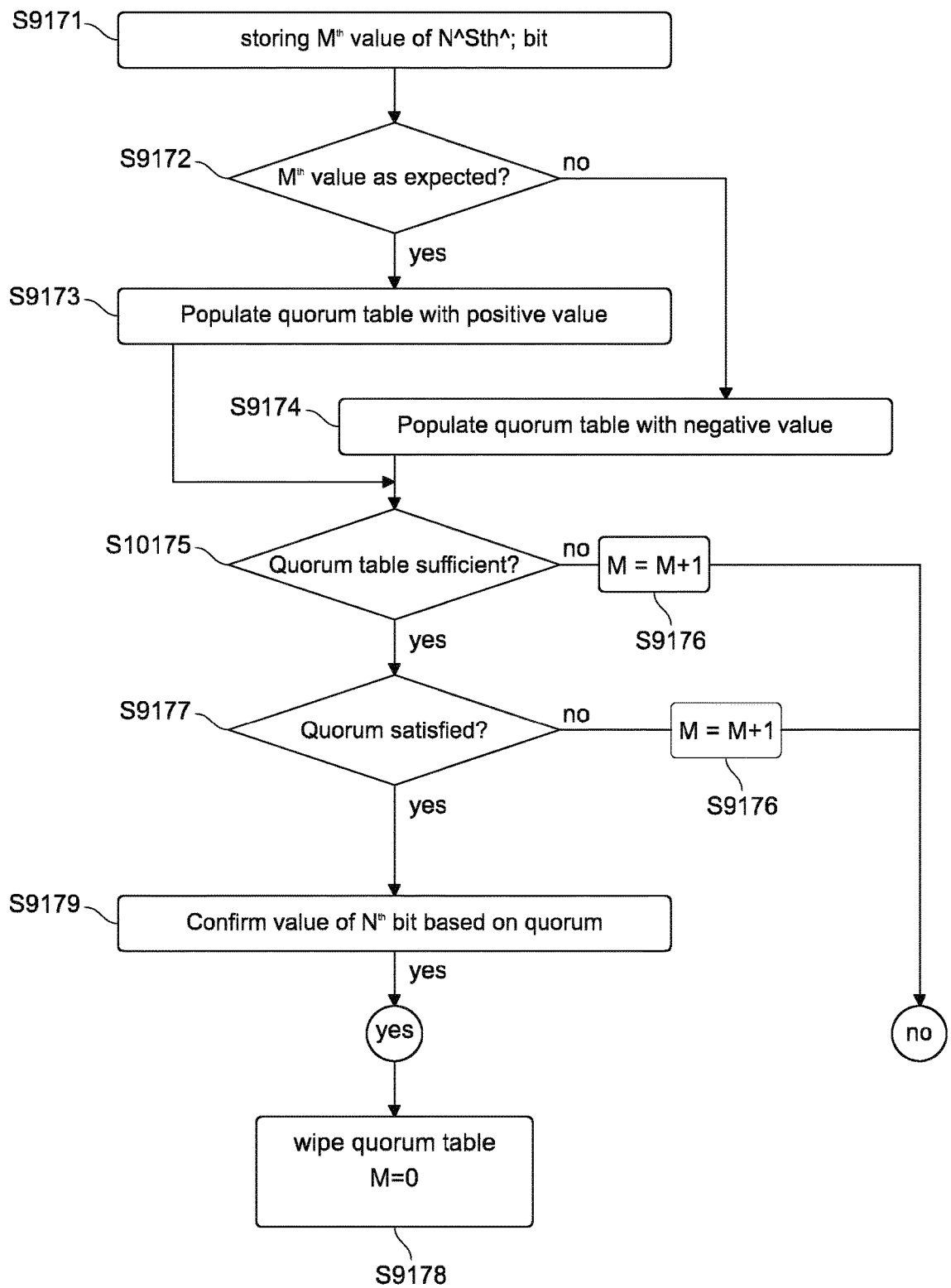
FIG. 10 schematically illustrates a possible implementation of a checking step S10170 according to an embodiment of the invention.

In some embodiments, the confirming step S9173-S9179 can further comprise a sixth checking step S10175 for checking if the quorum table has been populated to a predetermined level. This is illustrated, for instance, in the third checking step S10170 of FIG. 10.

The sixth checking step S10175 generally allows the quorum table to reach a predetermined size before a decision is made by the fifth checking step S9177. That is, the general approach of the third checking step S10170 is to ensure a sufficient number M values for the N-th bit is collected before the fifth checking step S9177 is carried out.

Which value of M may be judged to be sufficient may depend on the implementation of the quorum condition and/or on the configuration of the third checking step S10170.

It will be clear to those skilled in the art that the formulation of the quorum condition may, for instance, require a minimum number of positive and/or negative values in the quorum table to proceed to the quorum evaluation at fifth checking step S9177. For instance if the quorum condition is expressed as:

is the number of positive values in the quorum table higher than the number of negative values in the quorum table by a predetermined value equal to three?

It will be clear that such quorum condition cannot be evaluated if the quorum table is populated with three or less values. The presence of the sixth checking step S10175 thus advantageously allows avoiding running the fifth checking step S9177 if the quorum table is not populated enough for the fifth checking step S9177 to be performed. This may be advantageous since the fifth checking step S9177 may require more computational resources than the sixth checking step S10175.

Figure 11:
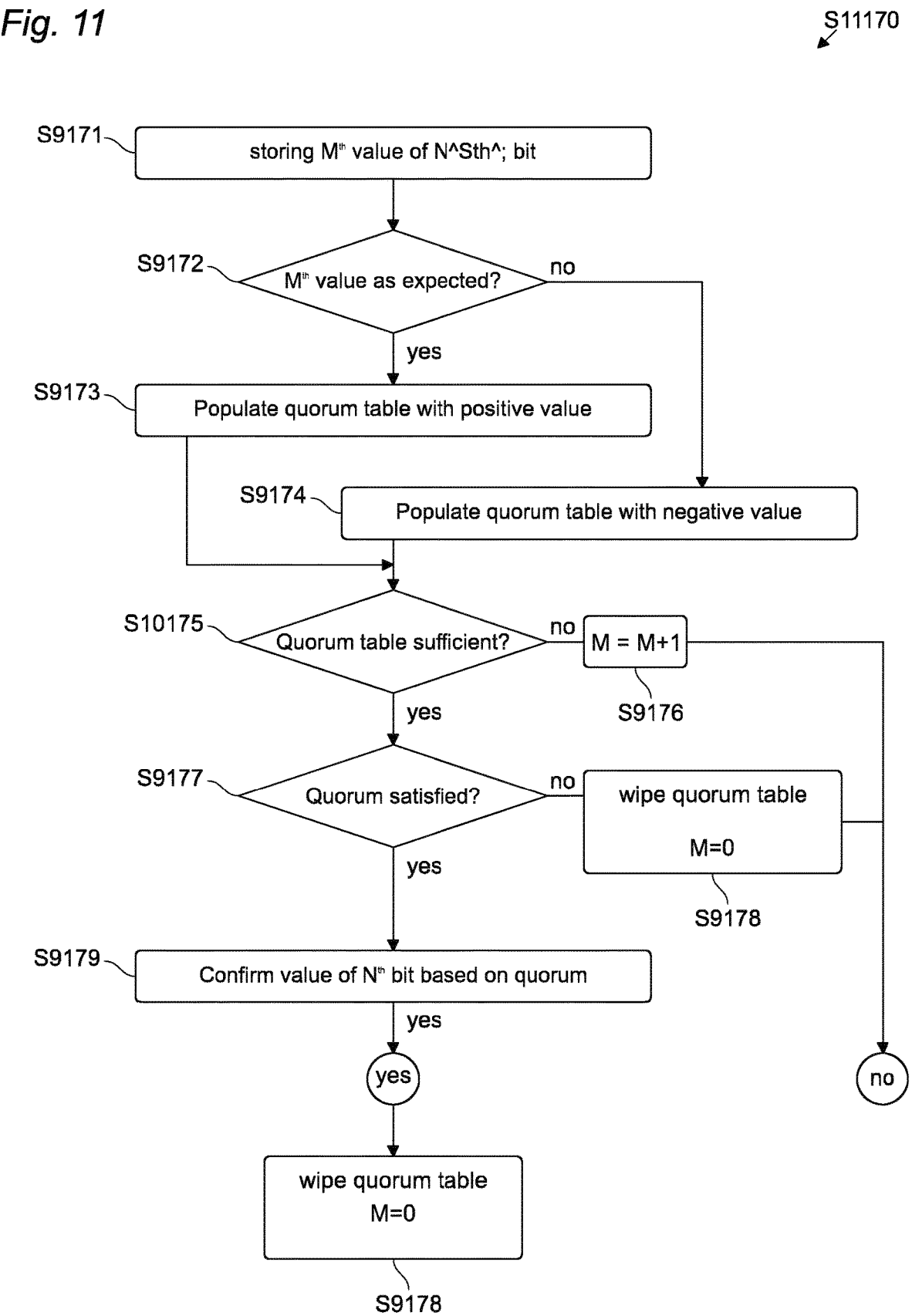
FIG. 11 schematically illustrates a possible implementation of a checking step S11170 according to an embodiment of the invention.

In some embodiments, the confirming step S9173-S9179 can further comprise another instance of the wiping step S9178 for wiping the quorum table. This is illustrated, for instance, in the third checking step S11170 of FIG. 11.

The general purpose of the wiping step S9178 is to wipe the quorum table and/or reset the counter M to 0. This additional instance of wiping step S9178 has the purpose of wiping the quorum table if a quorum could not be satisfied based on the current population of the quorum table.

In some embodiments, such wiping may be advantageous since starting with a new quorum table may, in case for instance of a longer disturbance on the quantum communication channel 4300, delete at once a plurality of values for the N-th bit which have been affected by the longer disturbance. That is, instead of requiring those plurality of values to be overwritten one by one, in case the quorum table is overwritten, or instead of requiring the quorum table to reach a size compensating for the plurality of values which have been affected by the longer disturbance, the wiping may result in a faster subsequent convergence toward a quorum.

In some embodiments, the confirming step S9173-S9179 can further comprise a calibrating step S12178 for calibrating the quorum condition. This is illustrated, for instance, in the third checking step S12170 of FIG. 12.

In particular, the calibrating step S12170 may change the numerical values of the quorum condition based on the results of the fifth checking step S9177. In particular, if the fifth checking step S9177 has a negative output it indicates that the quorum condition has not been satisfied. In some cases, this may due, for instance, due a poor quality of the quantum communication channel 4300. In those cases, it may be helpful to dynamically adjust the numerical values of the quorum condition so as to make it easier for the quorum condition to be satisfied.

In some embodiment, adjusting of the numerical values of the quorum condition may comprise increasing the size of the quorum table and/or increasing the size of the numerical values of the quorum condition at which the quorum table has to be populated to obtain a positive output at sixth checking step S10175.

In some embodiments, adjusting of the numerical values of the quorum condition may comprise decreasing the predetermined value of the majority of the positive and/or negative values needed to satisfy the quorum condition.

For instance, assuming an example in which the quorum table has a size of 200 values in total, that is, the sum of negative and positive values, and in which the quorum condition is expressed as:

are positive or negative values at least 70% of the size of the quorum table?

It will be clear that the fifth checking step S9177 will provide a positive outcome only when either positive or negative values reach a majority of 70% of the quorum table.

In some cases, if for instance the quantum communication channel 4300 is particularly noisy, it may not be possible to obtain such clear majority. It may thus be helpful to dynamically reduce the majority value and/or increase the size of the quorum table.

It will be clear that each execution of the calibrating step S12178 may iteratively increase the size of the quorum table and/or reduce the majority value. In some embodiments, at every iteration of the calibrating step S12178, the size of the quorum table may be increased by a predetermined value, preferably comprised between 5% and 20% of the current size of the quorum table. Alternatively, or in addition, in some embodiments, at every iteration of the calibrating step S12178, the majority value may be reduced by a predetermined value, preferably comprised between 10% and 50% of the difference between the current majority value and 51%.

It will be clear that this embodiment can be combined with previously described embodiments and, in particular, that a wiping step S9178 can be executed before or after the calibrating step S12178. In some of those embodiments, each time the output of the fifth checking step S9177 is negative the method may execute the wiping step S9178 and/or the calibrating step S12178.

In some of the latter embodiments, the number of executions of the wiping step S9178 and of the calibrating step S12178 may be different from each other. That is, for instance, the wiping step S9178 may be executed for each negative output of the fifth checking step S9177, while the calibrating step S12178 may be executed for one negative output every X negative outputs of the fifth checking step S9177, where X is higher than 1. In this manner, the calibrating step S12178 is executed less often than the wiping step S9178. This provides the additional advantage that the method tried more than once to fill up the quorum table based on the same quorum conditions before moving on to a different quorum condition, thus increasing robustness of the synchronization.

FIG. 13 schematically illustrates an exemplary synchronizing step S7100 implementing the checking step S9170. As will be clear form the following, one advantageous aspect of the third checking step S9170 consists in that it allows consensus being achieved even if the qubit being transmitted changes value from one transmission to the next one.

The example of FIG. 13 is based on the assumption that the qubit being transmitted, namely QB0, is transmitted by transmitter 4100 at the toggling frequency of clock 4140. It will be clear that this is not a requirement and the frequency of the transmission could be different from the frequency of clock 4140. Moreover, for the purpose of this example, it is assumed that the quorum condition is expressed as:

is there a majority of values, positive or negative, in the quorum table by at least a predetermined value equal to two?

and that the fifth checking step S9177 is implemented so to provide as positive output not only an indication that the quorum has been satisfied but also the value, positive or negative, of the quorum. That is, for instance, if the number of positive values in the quorum table is higher than the number of negative values by at least two, the quorum condition is satisfied and the output of the fifth checking step S9177 will also indicate a positive quorum. If, conversely, the number of negative values in the quorum table is higher than the number of positive values by at least two, the quorum condition is satisfied and the output of the fifth checking step S9177 will also indicate a negative quorum.

Figure 12:
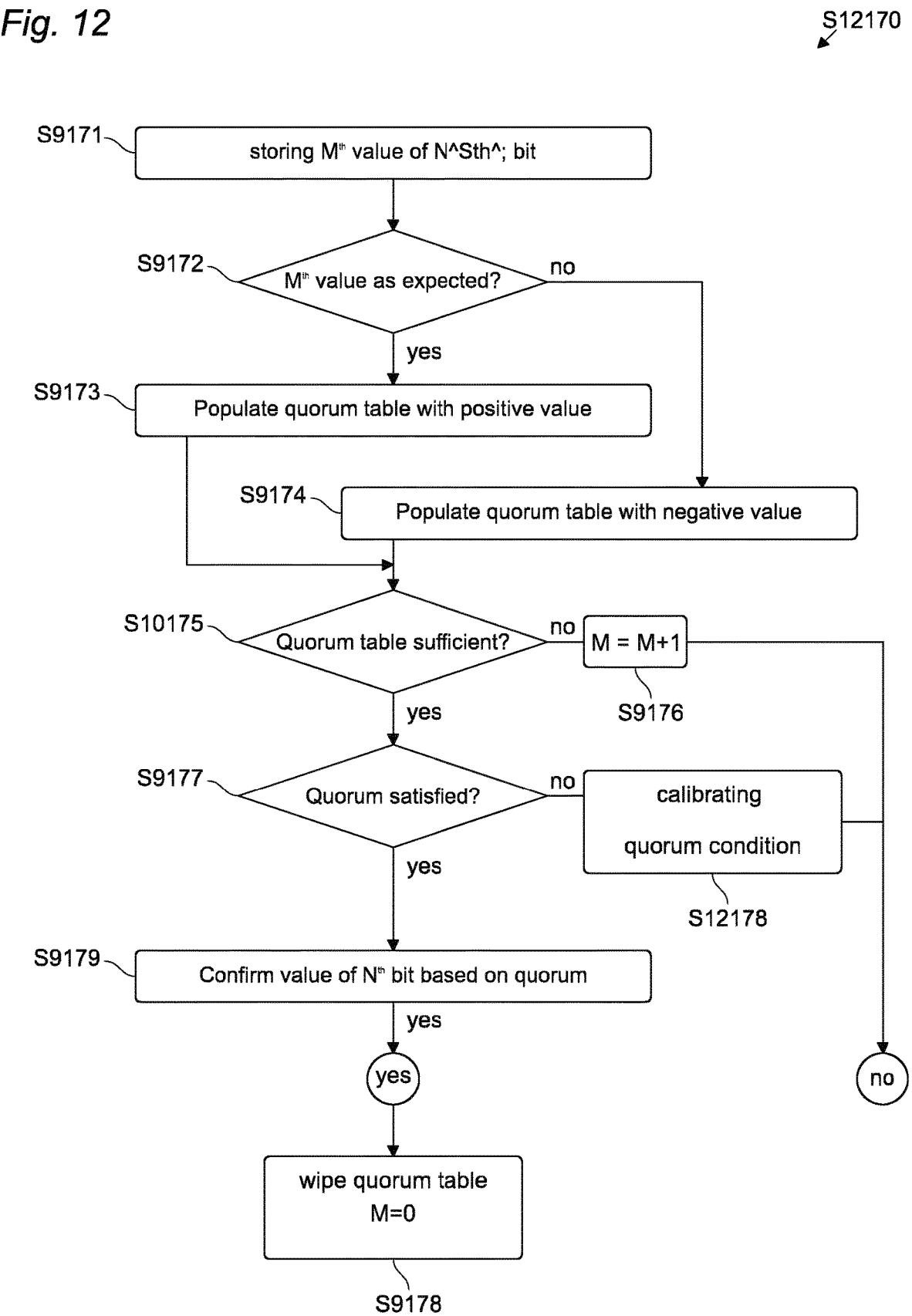
FIG. 12 schematically illustrates a possible implementation of a checking step S12170 according to an embodiment of the invention.

FIG. 12 further illustrates, on the right side, under the column indicated as 4240, the value of the N-th bit being received, namely the bit QB0, at the time of reception, in the clock 4240. As can be seen, for the purpose of this example it has been assumed that the bit QB0 of clock 4240 is not aligned with the bit QB0 of the clock 4140. The fourth checking step S9172 is assumed to be implemented by an XOR.

FIG. 13 further illustrates, on the right side, under the column indicated as quorum table, a schematic implementation of the quorum table as counter for the cumulative positive and negative values, respectively indicated as P and N. The table is incrementally updated every time steps S9173 or S9174 are carried out, while the table is wiped out by setting both P and N values at 0 at step S9178.

As can be seen in FIG. 12, at the beginning of the synchronizing step S7100, both P and N have a value of 0. As the various M reception of the QB0 happen at the receiver 4200, the quorum table is populated. As soon as the quorum condition is satisfied, namely when negative values N have a majority of at least two over the positive values P, that is at N=5 and P=3, the fifth checking step S9177 outputs a positive outcome, also indicating the negative quorum.

This information is received by the deciding step S9179, which uses this information to correct the value of QB0 at clock 4240, as can be seen at the bottom of FIG. 13, namely by inverting the value of the QB0 at the time of execution of the deciding step S9179, from 0 to 1, which results in the clock 4240 then toggling on its own from 1 to 0 in the next indicated period, that is the last value of QB0 of clock 4240 indicated at the bottom of FIG. 13. This, as visible, results in the alignment of clocks 4140 and 4240.

As it is visible from the example above, the synchronizing step S7100 implementing the third checking step S9170 is tolerant to non-detections ND as well as to a number of false detections due to noise on the quantum communication channel 4300. Moreover, it allows synchronization to be achieved even in the presence of a toggling value of the bit to be synchronized. Even further, it allows a fast synchronization compared to known synchronization methods of the prior art.

While the invention has been described above in terms of a method, it will be clear that the invention can also be implemented by hardware. In particular, an embodiment of the invention can relate to a receiver 4200 for a quantum key distribution system for distributing a secret key over a quantum communication channel 4300 between a transmitter 4100 and the receiver 4200. The receiver 4200 can comprise a controller 4230 configured to perform one or more of the following steps: the second transmitting step S2130, and/or the second checking step S5160, and/or the third checking step S7170, S9170, S10170, S11170.

More specifically, the controller 4230 can be implemented by electronic circuitry which can be configured, once by hardcoding and/or several times by appropriate software. For instance the controller 4230 can be implemented by an FPGA, a CPU, a microcontroller and/or by any combination of those elements, if necessary together with an additional memory element.

Although the invention has been described with reference to several distinct embodiments, it will be clear to those skilled in the art that various features of different embodiments can be freely combined, within the scope of the claims, to implement further embodiments of the invention.

That is, it will be clear to those skilled in the art that one or more feature from one or more embodiments can be combined in different embodiments without requiring all features form the respective embodiments to be combined together.

LIST OF REFERENCE NUMERALS

1000: quantum key distribution system
1100: transmitter
1200: receiver
1300: quantum communication channel
2000: quantum key distribution method
S2100: synchronizing step
S2110: setting step
S2120: N-th bit transmitting step
S2130: N-th bit acknowledgment of receipt transmitting step
S2140: checking step
S2150: incrementing step
S2200: distributing step
4000: quantum key distribution apparatus
4100: transmitter
4110: quantum communication channel transmitter
4120: service channel receiver
4130: controller
4140: clock
4200: receiver
4211: quantum communication channel receiver
4221: service channel transmitter
4230: controller
4240: clock 4300: quantum communication channel
4400: service channel
5000: quantum key distribution method
S5100: synchronizing step
S5160: checking step
7000: quantum key distribution method
S7100: synchronizing step
S7170: checking step
S9170: checking step
S9171: storing step
S9172: checking step
S9173: populating step
S9174: populating step
S9176: incrementing step
S9177: checking step
S9178: wiping step
S9179: deciding step
S10170: checking step
S10175: checking step
S11170: checking step
S12170: checking step
S12178: calibrating step

The invention claimed is:

1. A quantum key distribution method for distributing a secret key over a quantum communication channel between a transmitter and a receiver, the method comprising the steps of:
synchronizing a clock between the transmitter and the receiver, wherein the clock is a digital value, binary encoded on a plurality of bits from a least significant bit to a most significant bit,
distributing the secret key from the transmitter to the receiver, wherein the synchronizing step comprises:
a first transmitting step for transmitting a N-th bit of the clock from the transmitter to the receiver,
a second transmitting step for transmitting acknowledgement of reception of the N-th bit from the receiver to the transmitter,
a first checking step for checking if the N-th bit is the most significant bit of the clock, and
an incrementing step for incrementing the value of N if the first checking step indicates that the N-th bit is not the most significant bit of the clock.

2. The quantum key distribution method according to claim 1,
wherein the first transmitting step is executed across the quantum communication channel, and
wherein the second transmitting step is executed across a service channel different from the quantum communication channel.

3. The quantum key distribution method according to claim 1 wherein the synchronizing step further comprises,
a second checking step for checking if a value for the N-th bit has been detected at the receiver.

4. The quantum key distribution method according to claim 3 wherein the synchronizing step further comprises,
a third checking step for checking if a consensus for the value for the N-th bit has been reached at the receiver.

5. The quantum key distribution method according to claim 4 wherein the third checking step further comprises,
a storing step for storing a plurality of values for the N-th bit,
a fourth checking step for checking, for each of the plurality of values for the Nth bit stored in the storing step, if the stored value correspond to an expected value for the N-th bit,
a confirming step for confirming, based on a result of the fourth checking step a value for the N-th bit.

6. The quantum key distribution method according to claim 5, wherein the confirming step comprises,
a positive populating step for populating a quorum table with a positive value if the result of the fourth checking step is positive,
a negative populating step for populating a quorum table with a negative value if the result of the fourth checking step is negative,
a fifth checking step for checking if a predetermined quorum condition has been achieved,
a deciding step for deciding a value of the N-th bit based on a result of the fifth checking step and for outputting a positive value for the third checking step.

7. The quantum key distribution method according to claim 6, wherein the confirming step further comprises,
a sixth checking step for checking if the quorum table has been populated to a predetermined level,
a second incrementing step for incrementing a counter for the plurality of values for the N-th bit.

8. The quantum key distribution method according to claim 6, wherein the confirming step further comprises,
a wiping step for wiping the quorum table.

9. The quantum key distribution method according to claim 6, wherein the confirming step further comprises,
a calibrating step for calibrating the quorum condition.

10. A receiver for a quantum key distribution system for distributing a secret key over a quantum communication channel between a transmitter and the receiver, the receiver comprising a controller configured to perform the following steps:
synchronizing a clock between the transmitter and the receiver, wherein the clock is a digital value, binary encoded on a plurality of bits from a least significant bit to a most significant bit,
receiving, from the transmitter, the secret key, wherein the synchronizing step comprises:
receiving, from the transmitter, a N-th bit of the clock;
transmitting, to the transmitter, acknowledgement of reception of the N-th bit, wherein the transmitter is configured to perform:
a first checking step for checking if the N-th bit is the most significant bit of the clock, and
an incrementing step for incrementing the value of N if the first checking step indicates that the N-th bit is not the most significant bit of the clock;
checking if a value for the N-th bit has been detected at the receiver; and
checking if a consensus for the value for the N-th bit has been reached at the receiver.

* * * * *